(12) United States Patent
Mezzino et al.

(10) Patent No.: US 11,584,511 B2
(45) Date of Patent: Feb. 21, 2023

(54) SERVO-ACTUATOR ARCHITECTURE WITH ELECTROMECHANICAL-STABILITY AND CONTROL AUGMENTATION SYSTEM

(71) Applicant: Microtecnica S.r.l., Turin (IT)

(72) Inventors: Giacomo Mezzino, Turin (IT); Andrea Mornacchi, Turin (IT); Elio Mantia, Turin (IT)

(73) Assignee: MICROTECNICA S.R.L., Turin (IT)

( * ) Notice: Subject to any disclaimer, the term of this patent is extended or adjusted under 35 U.S.C. 154(b) by 58 days.

(21) Appl. No.: 17/172,356

(22) Filed: Feb. 10, 2021

(65) Prior Publication Data

US 2021/0253223 A1 Aug. 19, 2021

(30) Foreign Application Priority Data

Feb. 19, 2020 (EP) ..................................... 20158337

(51) Int. Cl.
*B64C 13/40* (2006.01)
*B64C 13/02* (2006.01)

(52) U.S. Cl.
CPC .............. *B64C 13/40* (2013.01); *B64C 13/02* (2013.01)

(58) Field of Classification Search
CPC ........ B64C 13/02; B64C 13/503; B64C 13/40
See application file for complete search history.

(56) References Cited

U.S. PATENT DOCUMENTS

| 6,241,182 B1* | 6/2001 | Durandeau ........... B64C 13/503 244/99.4 |
| 2010/0116929 A1* | 5/2010 | Hejda ................... F15B 15/088 244/99.3 |
| 2011/0031346 A1 | 2/2011 | Allieta et al. |
| 2014/0110532 A1* | 4/2014 | Covington .............. B64C 27/59 74/25 |

FOREIGN PATENT DOCUMENTS

| EP | 2722277 A1 | 4/2014 |
| EP | 3335987 A1 | 6/2018 |

OTHER PUBLICATIONS

Extended European Search Report for International Application No. 20158337.4 dated Sep. 3, 2020, 7 pages.

* cited by examiner

*Primary Examiner* — Richard G Davis
(74) *Attorney, Agent, or Firm* — Cantor Colburn LLP

(57) ABSTRACT

A Stability and Control Augmentation System ("SCAS") module comprising one or more SCAS actuators, the or each SCAS actuator comprising a mechanical component that translates rotational motion to linear motion along a first axis of said SCAS; one or more electric motors for driving linear movement of the mechanical component in response to a command signal; and one or more angular transducers to detect the position of the SCAS actuator along the first axis.

8 Claims, 4 Drawing Sheets

US 11,584,511 B2

SERVO-ACTUATOR ARCHITECTURE WITH ELECTROMECHANICAL-STABILITY AND CONTROL AUGMENTATION SYSTEM

FOREIGN PRIORITY

This application claims priority to European Patent Application No. 20158337.4 filed Feb. 19, 2020, the entire contents of which is incorporated herein by reference.

TECHNICAL FIELD

The present disclosure relates to a servo-actuator incorporating an electromechanical Stability and Control Augmentation System ("SCAS") for an aircraft, such as a helicopter.

BACKGROUND

The flight controls for a helicopter comprise various actuators that receive input commands from a pilot and provide an output for controlling the rotors in order to cause a desired movement. For instance, for creating movement in a particular direction, the 'cyclic' may be moved in that direction so as to tilt the main rotor blades and generate thrust in that direction. The thrust of the helicopter may be changed by changing the collective pitch of the main rotor blades by moving the 'collective' in order to move the helicopter up and down and/or increase the helicopter speed. The collective pitch of the tail rotor may be controlled by moving yaw pedals to counter the rotational effect of the main rotors.

Thus, helicopters typically comprise three main rotor actuators for providing outputs to the main rotor and one tail rotor actuator for providing outputs to the tail rotor.

A SCAS is used to superimpose a command generated by the flight computer (i.e. the "autopilot") onto the manual input generated from the pilot to the main or tail rotor actuators. The SCAS therefore helps maintain control and stability of the aircraft. The SCAS traditionally comprises a separate actuator from the main or tail rotor actuators.

More recently, systems have been developed in which the SCAS is integrated or embedded in the primary pilot control architecture. EP 3335987, for example, teaches an embedded SCAS in the form of a hydraulic actuator system as shown in FIGS. 1 to 3 and as described further below.

The inventors have noted that such systems can exhibit transitory behaviours which cannot be easily predicted and controlled; i.e. the activation of the solenoid could cause a pressure spike that could result in an uncommanded, temporary, displacement of the SCAS actuator. Moreover, the hydraulic SCAS architectures require several hydraulic components, which cause a considerable increase in the size and weight of the actuator compared to the version without SCAS. Also, as with all hydraulic systems, there is a risk of fluid leakage, positional accuracy is not guaranteed and reaction time is not immediate.

The inventors have, therefore, identified a need for an improved embedded SACS arrangement that overcomes at least some of these problems.

SUMMARY

According to a first aspect there is provided a Stability and Control Augmentation System ("SCAS") module comprising one or more SCAS actuators, the or each SCAS actuator comprising a mechanical component that translates rotational motion to linear motion along a first axis of said SCAS; one or more electric motors for driving linear movement of the mechanical component in response to a command signal; and one or more angular transducers to detect the position of the SCAS actuator along the first axis.

According to another aspect, there is provided an actuator system for a helicopter comprising The SCAS module or actuator system may further comprise a flight control system.

In a further aspect there is provided a helicopter comprising a main rotor, a tail rotor, and an actuator system substantially as described herein, wherein the actuator system controls a position and/or orientation of the main rotor and/or of the tail rotor.

BRIEF DESCRIPTION OF THE DRAWINGS

Various embodiments will now be described, by way of example only, and with reference to the accompanying drawings in which.

DETAILED DESCRIPTION

The present disclosure relates generally to actuator systems for use in controlling the flight of an aircraft, such as actuator systems for controlling the main and tail rotor actuators of a helicopter. An actuator system generally comprises a hydraulic actuator designed to accept mechanical and/or electrical input commands in order to control an output position of the actuator which in turn drives an external movable element. For instance, the output of the main rotor actuator acts to change the position and/or orientation of the main rotor blades. Similarly, a tail rotor actuator accepts mechanical and/or electrical input commands in order to change the position and/or orientation of the tail rotor blades. By controlling the position and/or orientations of the main and tail rotor blades of a helicopter, movement of the helicopter is controlled.

The input commands for controlling the actuator output may be received from the pilot and/or from a stability and control augmentation system ("SCAS"), wherein the SCAS is controlled by electrical input signals received from the Flight Control System ("FCS") of the aircraft. The FCS may also be referred to as the flight computer, or autopilot. The pilot typically has full authority over the output of the actuators, whereas the SCAS has only a limited authority. The SCAS may therefore effectively superimpose commands over the pilot's input to provide relatively fine corrections to help stabilise the helicopter flight.

Figure 1:
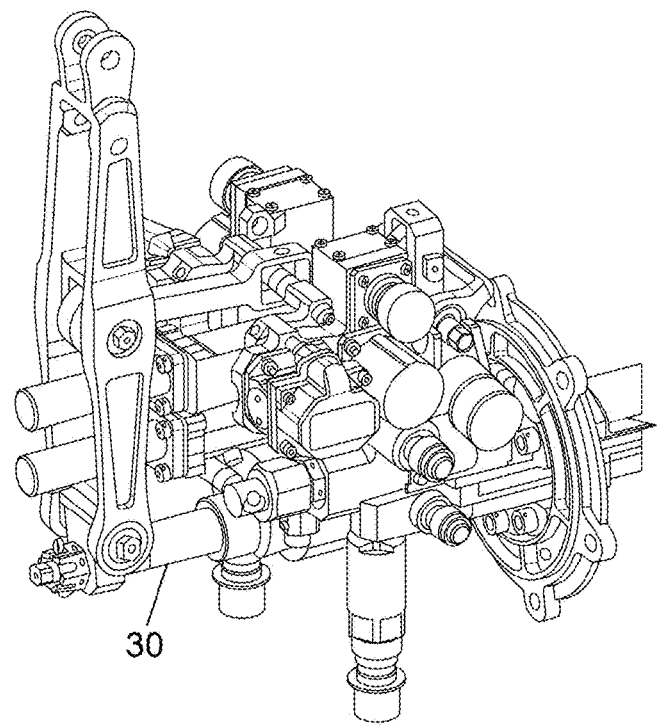
FIG. 1 shows a perspective view of an existing Tail Rotor Actuator embedded hydraulic SCAS.
Figure 2:
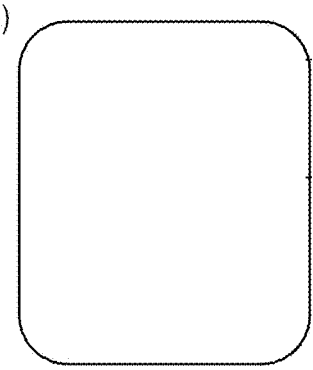
FIG. 2 shows a schematic view of a hydraulic SCAS module incorporated in a system such as shown in FIG. 1.
Figure 2:
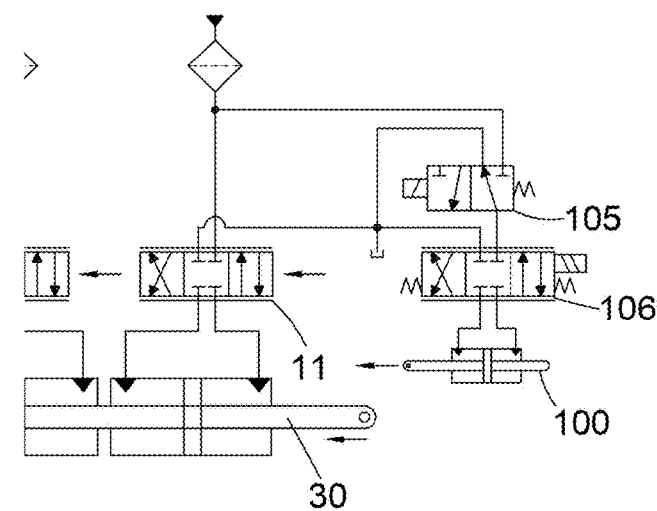
Figure 3:
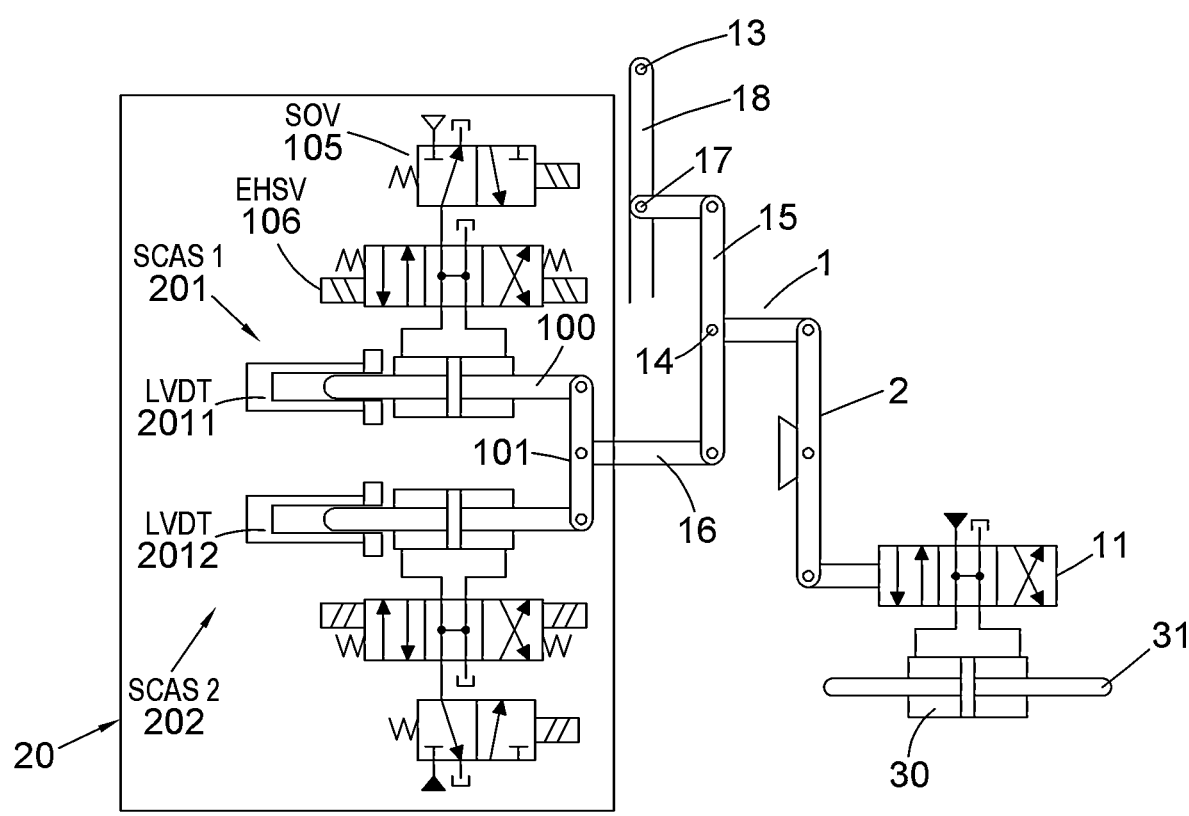
FIG. 3 shows a simplified schematic view of a hydraulic control architecture.

FIGS. 1 to 3 show actuator systems with an integrated hydraulic SCAS as described, e.g., in EP 3335987. SCAS commands may be integrated within the mechanical input from the pilot such that the SCAS is an integral part of the control module. Thus, the output from the SCAS module and the pilot input may both serve as input into the same mechanical system, which is then used to control the actuator. Generally, the output of the SCAS (i.e. the SCAS actuator output) is used to drive a movable element, which may e.g. comprise a component such as a lever within the integrated mechanical input system.

Figure 4:
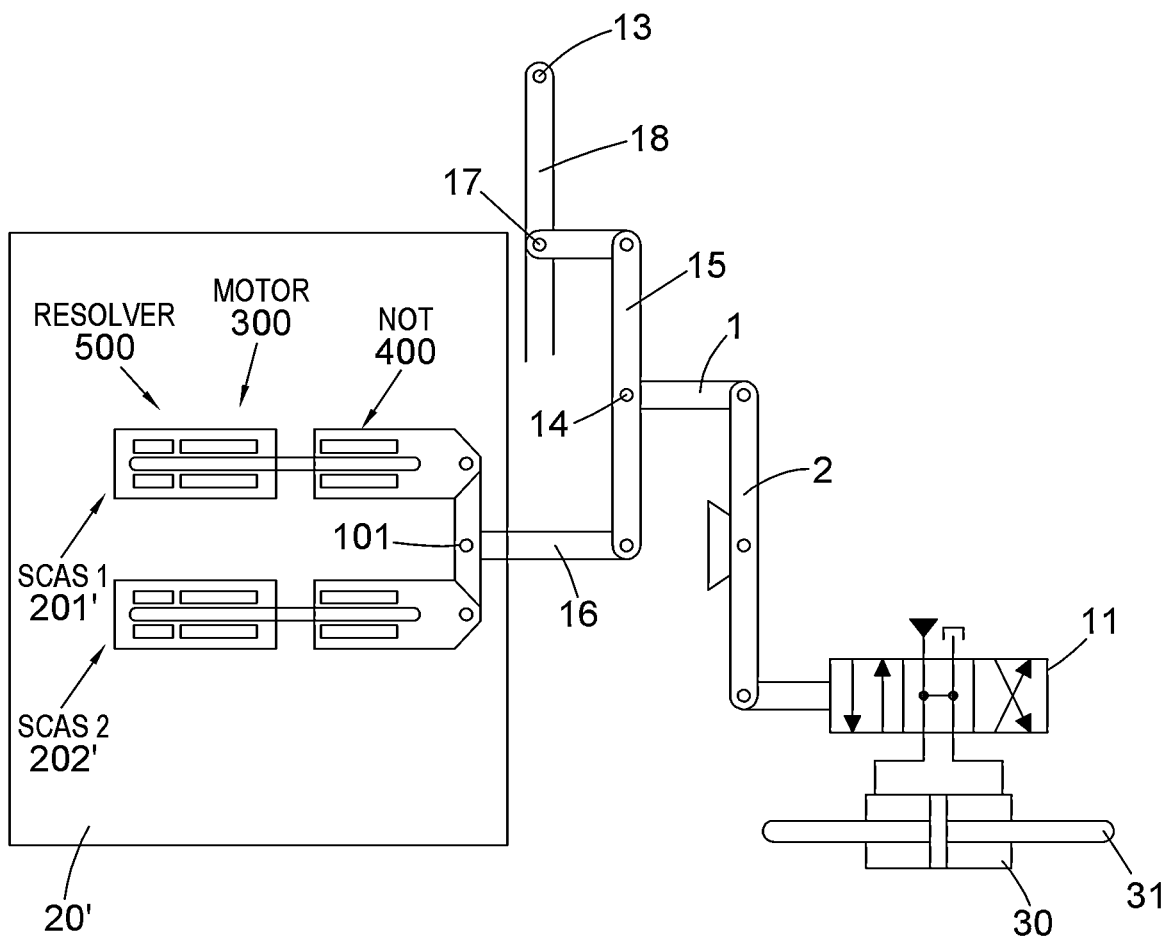
FIG. 4 shows a simple schematic view of an electromechanical SCAS architecture according to this disclosure.

The actuator systems with SCAS, as shown in FIG. 3 for the hydraulic architecture and FIG. 4 for the electromechanical configuration, comprises one main hydraulic actuator 10 comprising a double-acting piston 30 arranged to slide linearly within a substantially cylindrical housing. The movement of the main hydraulic actuator causes a displacement of a flight control surface, e.g. the rotor blade of a helicopter or the surface of a fixed-wing aircraft.

An actuator rod end 31 may be mounted at the moving rod side of the piston 30 to facilitate connection of the piston 30 to the moving parts of the flight control surface.

It can be seen that the output of the main rotor actuator 10 is controlled by a linkage mechanism connecting the main rotor actuator 10 to the main control valve 11. The linkage mechanism comprises a series of interconnected levers 18, 15, 1, 2, 16 and 101.

Particularly, as shown in FIG. 3, the linkage mechanism may comprise a first input lever 18 arranged to receive a pilot input at one end 13. The midpoint 17 of the first input lever 18 will be displaced, in use, by an amount equal to half the difference between the pilot input end 13 of the lever 18 and the displacement of the piston 30 of the actuator 10. The midpoint 18 of the input lever 15 may thus provide a mechanical input to the downstream portion of the linkage mechanism, and this input is transmitted to the control valve(s) 11. Responsive to this, the control valve(s) 11 may then meters the fluid flow to/from respective control lines to the hydraulic actuator 10 to cause the actuator output to change.

As shown in FIG. 3, a SCAS module 20 is integrated within the mechanical input system of the actuator 10 via the linkage mechanism. Particularly, the first input lever 18 is connected to an intermediate lever 15, which is connected by means of the lever 16 to the SCAS module 20. The intermediate lever 15 thus acts to sum the commands from the pilot and the SCAS into a single composite command. As a result, the spools of the control valves 11 are moved in response to input commands from the pilot and/or SCAS.

The linkage mechanism is described in more detail in EP3335987.

When a command to the main rotor actuator 10 is provided by the pilot at the upper end 13 of the first lever 18 and the actuators of the SCAS module 20 are stationary, the common output (J) of the SCAS module 20 is held fixed by the SCAS actuators and the control valve spools are displaced proportionally to the differential movements of pilot input and main hydraulic actuator displacement, which implements a feedback loop for the actuators position, as explained above. On the other hand, when the command to the main rotor actuator 10 is generated by the SCAS actuators (i.e. by the FCS) while the pilot input is stationary, the upper end 13 of the input lever 18 acts as a fixed point, and the displacement of the actuator 10 causes a rotation of the input lever 18 about its upper end 13 thereby causing a movement of its intermediate point 14.

It will be appreciated that the linkage mechanism need not take the form shown in FIG. 3 or in FIG. 4, and various suitable linkage mechanisms for combining and transmitting the various inputs to the control valve 11 in order to control the output of the actuator 10 are contemplated. However, a linkage mechanism similar to that shown in FIG. 3 or in FIG. 4 may provide a compact assembly, with a minimum number of parts and linkages. The linkage mechanism may therefore help minimise the degradation effects on performances due to misalignment of the various components without the use of additional linkages and spherical bearings which, because of wear, could introduce backlash and affect the SCAS dynamics.

The hydraulic SCAS module 20, as described in FIG. 3, is typically composed of two SCAS actuators 201,202, for redundancy. Each SCAS comprises a moveable piston 100 and end of which is connected via a lever 101 to intermediate lever 16. Each SCAS system is enabled by solenoid valve 105. The position of the piston is controlled by the servo valve 106 for the SCAS actuator. Each SCAS has a position sensor or transducer, such as a Linear Variable Differential Transformer ("LVDT") 2011,2021. Each SCAS actuator 201,202 interfaces with the flight control system (not shown), which provides an electrical input signal to modulate the respective servo valves to control the flow of hydraulic fluid to the SCAS actuators 201,202, and also provides an on/off signal to the solenoid valve to enable/disable the actuator operation.

The hydraulic SCAS architecture is described in more detail in EP3335987.

While the overall operation of such embedded SCAS has been found to be an improvement over the previously used separate SCAS, there are some disadvantages in using such hydraulic systems as mentioned above. Further, there is a trend now to more electric aircraft (MEA).

Figure 5:
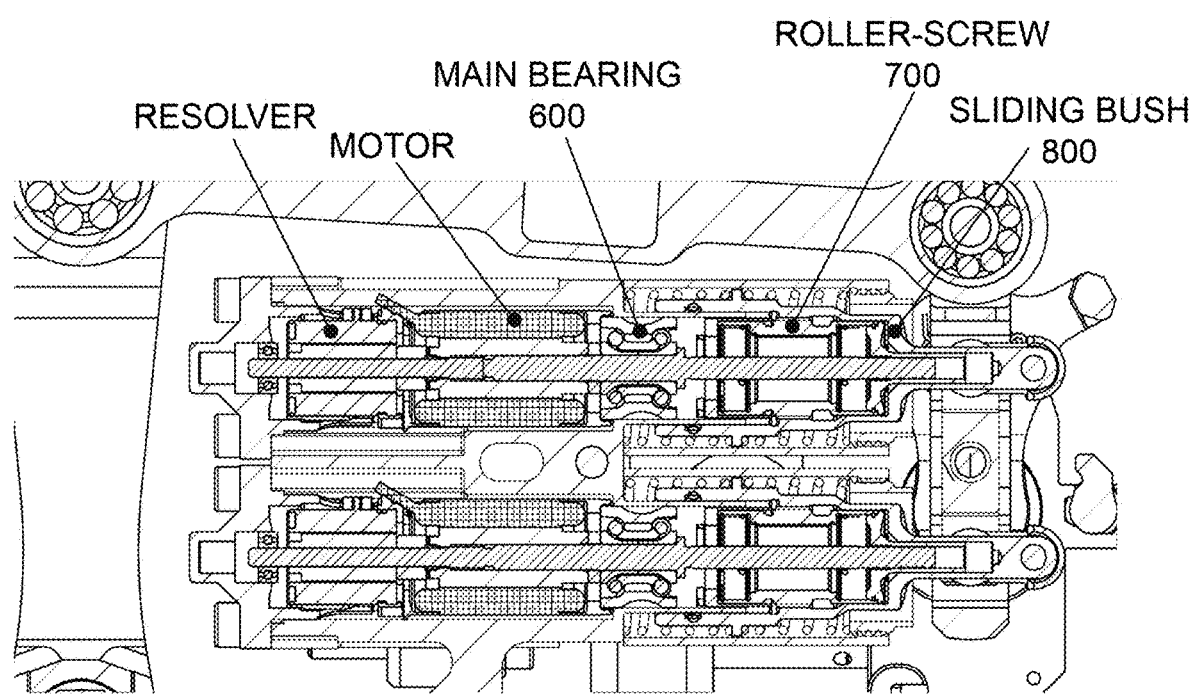
FIG. 5 shows a detailed sectional view of an a electromechanical SCAS architecture according to this disclosure.

According to this disclosure, the SCAS module 20 described above is replaced by a smaller, simpler, electronically controlled SCAS as shown with reference to FIGS. 4 and 5. The primary pilot control part of the architecture is as described above and is unchanged by this disclosure. The disclosure relates to a new SCAS module 20' comprising one or more electric SCAS 201', 202'. In the example shown, two SCAS are provided for redundancy and, as with the hydraulic SCAS described above, are connected to the primary pilot control part of the system via a lever 16'. The components of the system to the right of the lever 16' in FIG. 4 operate in the same way as described above and this will not be described again here.

In place of the solenoid valve and servo-valve and piston of the SCAS described above and shown in FIG. 3, the SCAS of the present disclosure comprises a motor 300, a nut 400, a roller-screw 700 and a resolver 500.

When the command to the main rotor actuator 10 is generated by the SCAS actuators (i.e. by the FCS) the motor 300 drives, via a roller-screw 700, a nut 400 into the required position. A bush causes a rotation of the lever 15 about its upper end 17, and this input is transmitted to the control valve(s) 11, through levers 1 and 2.

Since the pilot input is stationary, the upper end 13 and the middle point 17 of the input lever 18 acts as a fixed point.

In case of failure, re-centering of a nut 400 is guaranteed by the spring 900 which is compressed during nominal operation by means of the sliding bush 800.

The feedback of the position of the bush 800 is provided to the FCS by a resolver 500.

It will be appreciated that the electromechanical actuator need not take the form shown in FIGS. 4 and 5, and various suitable actuator architecture for controlling the position of the lever 16, and transforming the rotary motion of a electric motor 500 into a linear motion of a nut of the roller screw 400 are contemplated.

A roller-screw 700 can be replaced with a ballscrew, preserving the architecture and functioning of the system. A revolver 500 can be replaced by any other rotary transducer (i.e. Encoder, RVDT and hall effect sensor).

However, the architecture shown in FIGS. 4 and 5 may provide a good trade-off between SCAS performance and simplicity and lightness of the system. A roller-screw 700 allows minimising the degradation effects on performances due to the wear of the components that could introduce backlash and affect the SCAS dynamics.

Servo Actuator Operation

The following paragraphs present a functional description of the servo actuator under normal and failure conditions, and for the two possible operating modes: with mechanical commands provided by the pilot and with commands provided by the SCAS module 20' in response to electrical commands generated by the flight control system.

Mechanical Inputs i) Normal Operation

When a new command is given by the pilot, a rotation of the input lever 18 about its lower end connected to the actuator rod 30 occurs, hence a displacement of its intermediate point 17 is obtained. As a result, the intermediate lever 15' rotates about the SCAS input point (zero SCAS demand). The rotation of the intermediate lever produces a rotation of the lever 2' and thus a displacement of the control valve 11. The displacement of the control valve 11 away from the hydraulic null creates a pressure imbalance between the valve control lines and hence between the two sides of each section of the hydraulic actuator, which causes a movement of the actuator rod 30.

ii) Single System Operation

In case one of the two aircraft SCAS systems is not operating, the actuator section connected to that system cannot provide any active force. The system continues to operate under the action of the healthy actuator section, though with a lower maximum load capability. The servo actuator section connected to the active system operates as described above for the normal operating conditions, while the servo actuator section interfacing with the non-operational system is driven by the active one. When the actuator is commanded to move, the active actuator section develops the necessary motion to drive the helicopter control mechanism and the passive section of the actuator.

SCAS Operation

The SCAS actuators 201',202' provide a controlled displacement of the central point of the balance beam 101' in response to electrical signals received from the aircraft FCS. The controlled displacement of that point of the linkage mechanism has the effect of superimposing small amplitude commands to those established by the pilot.

Starting from a neutral condition, a displacement of the central point of the balance beam eventually brings about a displacement of the control valve spools. Flow is then delivered to the actuators, whose movement causes a progressive rotation of the input lever until the control valves spools are brought back to their hydraulic null position.

Each SCAS actuator 201',202' is capable of the defined travel.

i) SCAS Operation—Normal Condition

The SCAS actuators 201',202' provide a controlled displacement in response to electrical input signals received from the flight control system and feeds back to the flight control system electrical signals proportional to the SCAS output position, from the resolver, which enables the flight control system to perform a closed loop control of the SCAS actuators 201',202' position. Under normal operating conditions the SCAS actuators 201',202' operate in an active/active mode; their output displacements are summed by the balance beam 101'. The displacement of each SCAS actuator 201',202' is controlled by the motor whose current is determined by the flight control system according to an appropriate control law. The general control architecture is presented in the following.

For each SCAS actuator 201',202' the flight control system issues an arming signal to the motor to linearly move the nut of the roller screw 400.

The movement of the actuator is measured by its resolver 500 and provides feedback to the flight control system for position indication and monitoring of the SCAS actuators 201',202'.

ii) SCAS Operation—Failure Condition

If a SCAS actuator 201',202' fails, the failure is detected by the monitoring functions performed by the flight control system. When a failure is recognized, the flight control system introduces a compensation in the command of the remaining healthy actuator in order to allow the SCAS actuator common output to reach the commanded position.

Each of the two SCAS actuators 201',202' is individually controlled by an independent lane of the flight control system. The SCAS position commands generated by the flight control system in response to the aircraft aerodynamic loop are compared with the SCAS position feedback signals generated by the resolvers 500 of the SCAS actuators 201',202' and a position control loop is performed by the flight control system with the applicable control law.

Using the SCAS of this disclosure, a smaller, lighter, less complex actuator is achieved and no transitory behaviour occurs. Re-centering time is reduced and there is no need to match leakage paths to time requirements. Positional accuracy, efficiency and response times are improved compared to hydraulic systems, there is less wear on components and there is less risk of leakage as the only fluid in the SCAS is lubricant.

Although the techniques presented herein have been described with reference to particular embodiments, it will be understood by those skilled in the art that various changes in form and detail may be made without departing from the scope of the invention as set forth in the accompanying claims.

The invention claimed is:

1. A Stability and Control Augmentation System ("SCAS") module comprising one or more SCAS actuators, the or each SCAS actuator comprising:
    a mechanical component that translates rotational motion to linear motion along a first axis of said SCAS;
    one or more electric motors for driving linear movement of the mechanical component in response to a command signal;
    one or more angular transducers to detect the position of the SCAS actuator along the first axis; and
    first and second SCAS actuators, wherein the mechanical component of said first and second SCAS actuators are each operatively connected to a lever or balance beam to provide linear outputs thereto, and wherein said lever or balance beam is arranged to sum or otherwise combine the linear outputs provided by said first and second SCAS actuators;
    wherein the mechanical component includes a nut connected to the lever or balance beam such that rotary motion of the one or more electric motors translates to linear motion of the nut to cause linear motion of the mechanical component.

2. The SCAS module of claim 1, wherein the mechanical component comprises a roller screw.

3. The SCAS module of claim 1, wherein the mechanical component comprises a ballscrew.

4. The SCAS module of claim 1, further comprising:
a flight control system for providing electrical command signals to said one or more SCAS actuators,
wherein said motor controls the position of said piston along the first axis of the SCAS, in response to said electrical command signals.

5. An actuator system for a helicopter comprising:
a hydraulic actuator for providing an output to a main or tail rotor of the helicopter;
a SCAS" module as claimed in claim 1;
a control valve for controlling the flow of hydraulic fluid to said hydraulic actuator to vary said output provided to the main or tail rotor; and
a linkage mechanism connecting said control valve to said hydraulic actuator, said linkage mechanism comprising:
  a plurality of interconnected levers including a first lever for receiving an input from a pilot, and a second input arranged to receive an output from said SCAS module,
  wherein said linkage mechanism is configured to sum or otherwise combine the outputs from said first and second levers into a composite command and to transmit the composite command to the control valve to control the flow of hydraulic fluid to the hydraulic actuator.

6. The actuator system of claim 5, further comprising a flight control system for providing electrical command signals to said one or more SCAS actuators, wherein said motor controls the position of said piston along the first axis of the SCAS, in response to said electrical command signals.

7. The actuator system of claim 5, wherein the motion of the mechanical component along said first axis of said one or more SCAS actuator(s) is limited by one or more end stops provided within said SCAS module and/or within said linkage mechanism.

8. A helicopter comprising:
a main rotor;
a tail rotor; and
an actuator system as claimed in claim 5, wherein said actuator system controls a position and/or orientation of the main rotor and/or of the tail rotor.

* * * * *